US012659736B2

(12) United States Patent
Thanayankizil et al.

(10) Patent No.: US 12,659,736 B2
(45) Date of Patent: Jun. 16, 2026

(54) INTELLIGENT VEHICLE SYSTEMS AND CONTROL LOGIC FOR ENABLING VEHICLE CHARGING USING SMART WIRELESS CONNECTIVITY

(71) Applicant: GM GLOBAL TECHNOLOGY OPERATIONS LLC, Detroit, MI (US)

(72) Inventors: Lakshmi V. Thanayankizil, Troy, MI (US); Sandeep U. Menon, Troy, MI (US); Nnamdi U. Uwakwe, Livingston, NJ (US); Thomas Doran, Shelby Township, MI (US); Ravid Erez, Hod-Hashron (IL)

(73) Assignee: GM Global Technology Operations LLC, Detroit, MI (US)

( * ) Notice: Subject to any disclaimer, the term of this patent is extended or adjusted under 35 U.S.C. 154(b) by 652 days.

(21) Appl. No.: 18/314,937

(22) Filed: May 10, 2023

(65) Prior Publication Data

US 2024/0381079 A1 Nov. 14, 2024

(51) Int. Cl.
| | |
|---|---|
| *B60L 53/66* | (2019.01) |
| *B60L 53/12* | (2019.01) |
| *B60L 53/16* | (2019.01) |
| *B60L 53/65* | (2019.01) |
| *B60L 53/68* | (2019.01) |
| *H04W 12/037* | (2021.01) |
| *H04W 12/06* | (2021.01) |

(Continued)

(52) U.S. Cl.
CPC ............. *H04W 12/06* (2013.01); *B60L 53/12* (2019.02); *B60L 53/16* (2019.02); *B60L 53/65* (2019.02); *B60L 53/66* (2019.02); *B60L 53/68* (2019.02); *H04W 12/037* (2021.01); *H04W 12/63* (2021.01); *B60L 50/60* (2019.02); *B60L 2240/72* (2013.01)

(58) Field of Classification Search
CPC ... H04W 12/06; H04W 12/037; H04W 12/63; B60L 53/12; B60L 53/68; B60L 53/66; B60L 53/16; B60L 53/65
USPC ......................................................... 320/109
See application file for complete search history.

(56) References Cited

U.S. PATENT DOCUMENTS

| | | | |
|---|---|---|---|
| 8,878,488 | B2 | 11/2014 | Ono |
| 9,071,074 | B2 | 6/2015 | Chen |

(Continued)

*Primary Examiner* — Nathaniel R Pelton
(74) *Attorney, Agent, or Firm* — Quinn IP Law

(57) ABSTRACT

Presented are vehicle charging systems and control logic provisioning smart vehicle charging using encrypted wireless connectivity, methods for making/using such systems, and vehicles interoperable with such systems. A method of controlling a charging operation of a vehicle includes a vehicle controller retrieving a unique ID assigned to the vehicle from a memory device. When approaching an electric vehicle charging station (EVCS), the controller responsively embeds the unique ID in a wireless message, including encrypting and inserting the unique ID into a dedicated extension frame within the wireless message. The vehicle then broadcasts the wireless message with the embedded and encrypted unique ID. An EVCS controller parses the encrypted unique ID from the wireless message and transmits the encrypted unique ID to a back-office (BO) vehicle services provider. When the BO vehicle services provider decrypts and authenticates the unique ID, the EVCS controller responsively commences charging of the vehicle's battery pack.

20 Claims, 3 Drawing Sheets

(51) Int. Cl.
  *H04W 12/63*    (2021.01)
  *B60L 50/60*    (2019.01)

(56)          References Cited

U.S. PATENT DOCUMENTS

| | | | |
|---|---|---|---|
| 9,091,735 B2 | 7/2015 | Wang et al. | |
| 10,809,733 B2 | 10/2020 | Lindemann et al. | |
| 11,135,931 B2 | 10/2021 | Martin | |
| 11,462,752 B2 | 10/2022 | Pettit | |
| 2013/0337669 A1 | 12/2013 | Najera | |
| 2016/0285296 A1 | 9/2016 | Manou | |
| 2017/0299401 A1 | 10/2017 | Choi | |
| 2020/0353839 A1 | 11/2020 | Tarchinski | |
| 2022/0355697 A1 | 11/2022 | Wiebenga | |
| 2023/0302949 A1* | 9/2023 | Liou | B60L 53/68 |
| 2024/0174112 A1* | 5/2024 | Layouni | B60L 53/66 |

* cited by examiner

INTELLIGENT VEHICLE SYSTEMS AND CONTROL LOGIC FOR ENABLING VEHICLE CHARGING USING SMART WIRELESS CONNECTIVITY

INTRODUCTION

The present disclosure relates generally to electrical systems for charging motor vehicles. More specifically, aspects of this disclosure relate to systems and methods for governing vehicle charging using alternating current (AC) electric supply equipment.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, rechargeable battery cells, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

High-voltage (HV) electrical systems govern the transfer of electricity between the traction motors and the rechargeable battery packs that supply the requisite power for operating many hybrid-electric and full-electric powertrains. To provide the power capacity and energy density needed to propel a vehicle at desired speeds for desired ranges, contemporary traction battery packs group multiple battery cells (e.g., 8-16+ cells/stack) into individual battery modules (e.g., 10-40+ modules/pack) that are electrically interconnected with one another and mounted onto the vehicle chassis, e.g., by a battery pack housing or support tray. Located on a battery side of the HV electric system is a front-end DC-to-DC power converter that is electrically connected to the battery pack(s) in order to increase the level of voltage supplied to a main DC bus and an AC/DC power inverter module (PIM). Arranged across the positive and negative terminals of the main DC bus is a high-frequency bulk capacitor that provides electrical stability and stores supplemental electrical energy. A dedicated Electronic Battery Control Module (EBCM), through collaborative operation with a Powertrain Control Module (PCM) and each motor's power electronics package, governs operation of the battery pack(s) and traction motor(s).

As hybrid and electric vehicles become more prevalent, infrastructure is being developed and deployed to make day-to-day use of such vehicles feasible and convenient. Electric vehicle supply equipment (EVSE) for recharging electric-drive vehicles comes in many form factors, including residential electric vehicle charging stations (EVCS) that are purchased and operated by a vehicle owner (e.g., installed in the owner's garage), publicly accessible EVCS offered by public utilities or private retailers (e.g., at municipal or commercial charging facilities), and advanced high-voltage, fast-charging stations used by manufacturers, dealers, and service stations. (e.g., OEM multi-coupler 360+ kW DCFC superchargers). Plug-in-type hybrid and electric vehicles, for instance, may be recharged by physically connecting a charging cable of the EVSE to a complementary charging port of the vehicle. By comparison, wireless AC charging systems utilize electromagnetic field (EMF) induction to provide vehicle charging capabilities without the need for charging cables and cable ports. In most countries, a standardized conductive charger coupler is used to connect the EVCS to the vehicle's HV electrical system. The plug-in vehicle is equipped with a standardized charger inlet port for electrically mating with the charger coupler and locking the coupler in place to prevent inadvertent or unwanted decoupling.

SUMMARY

Presented herein are vehicle charging systems with control logic for provisioning smart vehicle charging using encrypted wireless connectivity, methods for manufacturing and methods for operating such systems, and wireless-enabled vehicles interoperable with such systems. By way of illustration, and not limitation, systems and methods are presented for enabling vehicle charge authorization using smart WiFi or SRC connectivity on Level 2 AC EVCS. To provision smart charging capabilities across legacy charging stations that do not support digital programmable logic controller (PLC) communications (comm), an encrypted vendor extension is created for secure connectionless identity detection; contactless EV charge authorization is achieved using a wireless comm handshake embedded with the encrypted vendor extension. A two-step bidirectional location and time check protocol may be employed to identify and triangulate a real-time location of a host vehicle. In tandem, the host vehicle and EVCS may collaboratively exchange bidirectional data identification (ID) data during vehicle approach and plug-in/EMF coupling using a wireless comm and timestamps to identify a vehicle proximity to the EVCS and establish a distinct charger identify for the EVCS among multiple charging stations. A self-diagnostic algorithm may selectively enable/disable EV-charge authorization using customer/vehicle ID data for existing legacy charger installations in shared parking environments. The smart charging protocol may selectively upgrade or downgrade a host vehicle's unique identification code that is verifiable by a back-office (BO) vehicle service provider (e.g., ONSTAR® or MYGMC®) to identify and track the host vehicle relative to the EVCS from approach to plug-in, e.g., using existing properties/capabilities of available wireless protocols.

Aspects of this disclosure are directed to vehicle charging systems, system control logic, and memory-stored instructions for enabling smart charging operations. In an example, a method is presented for controlling a charging operation of a host vehicle, which has a rechargeable battery pack, a wireless communications device, and a resident or remote controller or module or network of controllers/modules (collectively "controller"). This representative method includes, in any order and in any combination with any of the above and below disclosed options and features: retrieving, e.g., via the vehicle controller from a resident or remote memory device, a unique ID assigned to the host vehicle; embedding, e.g., via the vehicle controller responsive to approaching an EVCS, the unique ID in a wireless message (e.g., WiFi packet, V2X DSRC beacon, etc.), the embedding including encrypting and inserting the unique ID into a dedicated extension frame within the wireless message (e.g., between or in either the payload and trailer frames); broadcasting, e.g., via the vehicle controller from the wireless communications device to one or more EVCS, the wireless message with the embedded and encrypted unique ID; transmitting, e.g., from the EVCS controller to a back-office vehicle services provider (e.g., "off-board" cloud computing host system), the encrypted unique ID parsed from the wireless message; and commencing, e.g., via the EVCS controller responsive to the BO vehicle services provider decrypting and authenticating the unique ID, one or more charging operations of the host vehicle's battery pack with the EVCS.

Aspects of this disclosure are also directed to computer-readable media (CRM) for enabling smart charging operations for motor vehicles. In an example, non-transitory CRM store instructions that are executable by a host vehicle's controller and/or an EVCS's controller. When executed, these instructions cause the controllers to perform operations, including: retrieving, via the vehicle controller from a memory device, a unique ID assigned to the host vehicle; embedding, via the vehicle controller responsive to approaching an EVCS, the unique ID in a wireless message, the embedding including encrypting the unique ID and inserting the encrypted unique ID into a dedicated extension frame within the wireless message; broadcasting, via the vehicle controller from the wireless communications device to the EVCS, the wireless message with the encrypted unique ID embedded in the wireless message; transmitting, from the EVCS controller to a back-office vehicle services provider, the encrypted unique ID parsed from the wireless message; and commencing, via the EVCS controller responsive to the BO vehicle services provider decrypting and authenticating the unique ID, the charging operation of the rechargeable battery pack of the host vehicle by the EVCS.

Additional aspects of this disclosure are directed to motor vehicles with intelligent vehicle systems for enabling smart vehicle charging. As used herein, the terms "vehicle" and "motor vehicle" may be used interchangeably and synonymously to reference any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles, motorcycles, farm equipment, watercraft, aircraft, etc. In an example, a vehicle charging network contains one or more host vehicles, each of which includes a vehicle body with a passenger compartment, multiple road wheels mounted to the vehicle body (e.g., via corner modules coupled to a unibody or body-on-frame chassis), and other standard original equipment. For electric-drive applications, one or more electric traction motors operate alone (e.g., for FEV powertrains) or in conjunction with an internal combustion engine (e.g., for HEV powertrains) to selectively drive one or more of the road wheels to propel the vehicle. A traction battery pack containing multiple battery cells is mounted onto the vehicle and operable to power the traction motor(s).

Continuing with the preceding discussion, each host vehicle is also equipped with a vehicle controller (e.g., single controller, network of controllers, resident/remote controller or module, etc.) that is programmed to access a resident or remote memory device to retrieve a unique ID assigned to that specific host vehicle. The vehicle controller then embeds the unique ID in a wireless message, including encrypting and inserting the unique ID into a dedicated extension frame within the wireless message. The vehicle controller broadcasts this wireless message with embedded ID from a resident wireless communications device of the host vehicle. A respective EVCS controller of each EVCS within proximity to the host vehicle may receive the broadcast message and concomitantly parse the encrypted unique ID from the wireless message. The EVCS controller then transmits the parsed and encrypted unique ID to a BO vehicle services provider for evaluation and charge authorization. When the BO vehicle services provider decrypts and authenticates the unique ID, the EVCS controller responsively commences a charging operation of the host vehicle's rechargeable battery pack by the EVCS.

For any of the disclosed systems, methods, and CRM, the EVCS controller may determine a charger-to-vehicle distance between the EVCS and the host vehicle's wireless communications device using a wireless localization technique. The EVCS controller then transmits the charger-to-vehicle distance to the BO vehicle services provider. In this instance, the vehicle controller may determine a vehicle-to-charger distance between the host vehicle and the EVCS using one or more of the host vehicle's on-vehicle sensing devices. The vehicle controller then transmits the vehicle-to-charger distance, e.g., through the EVCS, to the BO vehicle services provider. In this instance, the BO vehicle services provider may calculate a distance differential as an absolute value of a mathematical difference between the vehicle-to-charger distance and the charger-to-vehicle distance. The BO may then determine whether or not the calculated distance differential is less than a preset distance differential threshold; if it is, the BO vehicle services provider may conclude the unique ID is authentic and output an electronic notification indicative thereof to the EVCS controller.

For any of the disclosed systems, methods, and CRM, the vehicle controller may determine and transmit, e.g., through the EVCS to the BO vehicle services provider, a vehicle coupling timestamp indicative of when the host vehicle operatively couples to the EVCS for charging the vehicle's battery pack. Likewise, the EVCS controller may determine and transmit to the BO vehicle services provider a charger coupling timestamp indicative of when the host vehicle operatively couples to the EVCS. In this instance, the BO may calculate a time differential as an absolute value of a mathematical difference between the vehicle-output timestamp and the EVCS-output timestamp. The BO may then determine whether or not the calculated time differential is less than a preset time differential threshold; if it is, the BO vehicle services provider may conclude the host vehicle's unique ID is authentic and output an electronic notification indicative thereof to the EVCS controller.

For any of the disclosed systems, methods, and CRM, the vehicle controller may determine and transmit, e.g., through the EVCS to the BO vehicle services provider, a vehicle geopositioned data set indicative of a real-time location of the host vehicle. Likewise, the EVCS controller may determine and transmit to the BO vehicle services provider an EVCS geopositional data set indicative of a real-time location of the EVCS. In this instance, the BO may determine whether or not the vehicle's geopositional data/real-time position is approximately equal to the EVCS's geopositional data/real-time position; if it is, the BO vehicle services provider may conclude the host vehicle's unique ID is authentic and output an electronic notification indicative thereof to the EVCS controller.

For any of the disclosed systems, methods, and CRM, the vehicle controller, when approaching the EVCS, may responsively encrypt and embed a unique shared message in the wireless message (e.g., within the dedicated extension frame of the encrypted unique ID). In this instance, the EVCS controller may use the unique shared message embedded in the wireless message to determine whether or not the host vehicle is within a predetermined proximity to the EVCS. As another option, the vehicle controller may determine whether or not the host vehicle is operatively coupled to the EVCS for charging the rechargeable battery pack. Responsive to the host vehicle being operatively coupled to the EVCS, the vehicle controller may append to the wireless message a vehicle geopositional data set, which is indicative of a real-time location of the host vehicle, and a vehicle coupling timestamp, indicative of the time at which the host vehicle was operatively coupled to the EVCS. In this instance, the BO vehicle services provider may authenticate the unique ID based, at least in part, on the vehicle's geopositional data set and the vehicle's coupling timestamp.

For any of the disclosed systems, methods, and CRM, the host vehicle may be operatively coupled to the EVCS by manually inserting an electrical connector plug of the EVCS into a plug port of the host vehicle. As another option, the host vehicle may be operatively coupled to the EVCS by aligning above or otherwise mating a wireless power transfer (WPT) receiving component (e.g., EMF coil) of the host vehicle with a WPT transmitter component (e.g., EMF pad) of the EVCS. In yet another option, the wireless communications device may take on a variety of different form factors, including a WiFi hotspot device and/or a short-range communications (SRC) device. In this instance, the wireless message may be in the nature of a network data packet and/or a quick-charge communications handshake. While not per se limited, disclosed features may be particularly applicable to vehicle charging stations in the form of Level 2 AC EVCS that are operable to output power at about 60 amperes (A) or less and 240 volts (V) or less, and are characterized by a lack of PLC communications capabilities.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
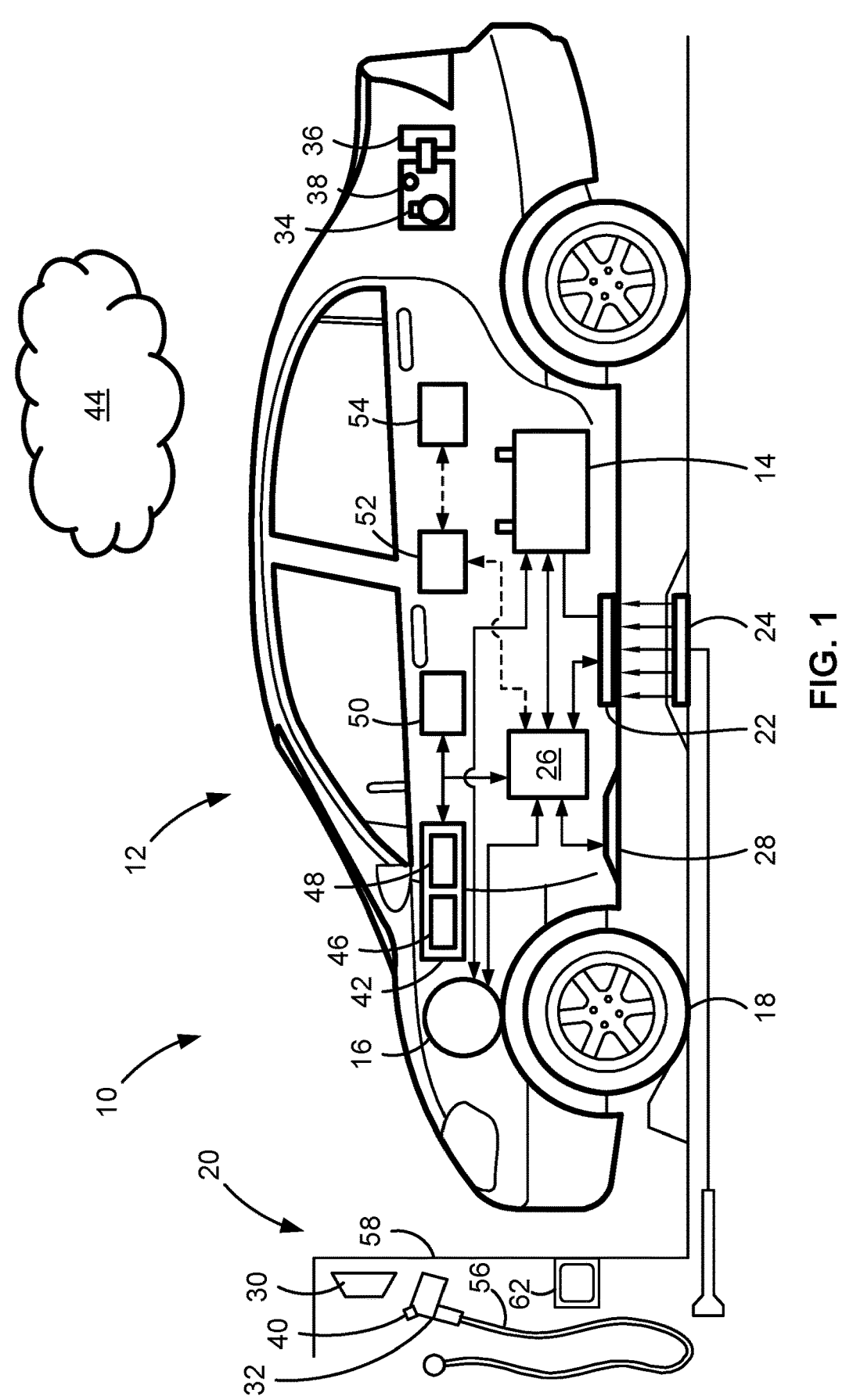
FIG. 1 is a partially schematic, side-view illustration of a representative motor vehicle with an electrified powertrain, a rechargeable battery pack, and a network of in-vehicle controllers, sensing devices, and communication devices for automating vehicle authorization and smart charging in accord with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Description of the Drawings, and Detailed Description sections, but not explicitly set forth in the claims, should not be incorporated into the claims, singly or collectively, by implication, inference or otherwise. Moreover, recitation of "first", "second", "third", etc., in the specification or claims is not used to establish a serial or numerical limitation; unless specifically stated otherwise, these designations may be used for ease of reference to similar features in the specification and drawings and to demarcate between similar elements in the claims.

For purposes of this Detailed Description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which aspects of this disclosure may be practiced. In the same vein, integration of the present concepts into the networked vehicle charging system 100 of FIG. 2 should also be appreciated as a non-limiting implementation of disclosed features. As such, it will be understood that aspects and features of this disclosure may be applied to other vehicle powertrain designs, incorporated into any logically relevant type of motor vehicle, and implemented into a myriad of different vehicle charging system architectures. Moreover, only select components of the motor vehicles, vehicle charging equipment, and networked charging systems are shown and described in additional detail herein. Nevertheless, the vehicles, EVSE, and charging systems discussed below may include numerous additional and alternative features, and other available peripheral components, for carrying out the various methods and functions of this disclosure.

FIG. 1 is a simplified illustration of the electric-drive vehicle 10 docked at and operatively coupled to an EVCS 20 of a vehicle charging system for recharging an onboard rechargeable energy storage system (RESS), which is represented in part by a high-voltage direct current (DC) traction battery pack 14. Traction battery pack 14 may take on many suitable configurations, including an array of lead-acid, lithium-ion, nickel-metal hydride, or other apposite electric vehicle battery (EVB). To provide an operable coupling between the traction battery pack 14 and EVCS 20 (also referred to herein as "charging station"), the vehicle 10 may include a wireless power transfer (WPT) charging component 22, e.g., with an integrated induction coil, that is mounted to the underside of the vehicle body 12 between drive wheels 18. This charging component 22 functions as a wireless charging interface that is compatible with a WPT charging pad 24, e.g., containing an internal EMF coil or other wireless power transfer hardware, of the vehicle charging station 20. In the illustrated example, the wireless charging pad 24 is fixtured to the floor underneath the vehicle 10 and is positioned in accordance with a "target position" that may serve as a desired parking location for purposes of efficient and effective wireless charging of the pack 14. By way of example, FIG. 1 depicts the vehicle 10 parked in a manner that helps to ensure the inductive charging component 22 is aligned in both lateral and longitudinal directions (i.e., in proper fore-aft and starboard-port alignment) with the wireless charging pad 24 to complete an inductive charging event for the vehicle 10.

The vehicle charging station 20 may employ any heretofore and hereafter developed type of wired and wireless charging technology, including inductive charging, radio charging, capacitive charging, magneto-dynamic charging, and resonance charging, as some non-limiting examples. As for electromagnetic induction charging technology, the representative wireless charging pad 24 of FIG. 1 may be activated with electric current to generate an alternating electromagnetic field proximate the WPT charging component 22. This magnetic field, in turn, induces an electric current in the charging component 22 of the vehicle 10. The induced current may be filtered, stepped-up/down, and/or phase-shifted by in-vehicle electrical modulation circuitry (e.g., power inverter module (PIM)), voltage transformer, etc.) to charge the traction battery pack 14 or any other energy source of the vehicle 10 (e.g., 12V lead-acid starting, lighting, and ignition (SLI) battery, EV super capacitor, etc.). While not per se limited, aspects of this disclosure may be particularly suited for use with plug-in or WPT-type Level 2 AC EVSE that is not equipped or programmed to perform digital PLC comm operations.

Traction battery pack 14 stores energy that can be used for propulsion by one or more electric traction motors 16 and, if desired, for operating other vehicle electrical hardware and auxiliary loads. The traction battery pack 14 is communicatively connected (wired or wirelessly) to one or more vehicle controllers, represented in FIG. 1 by electronic control unit (ECU) 26, that regulates the operation of various onboard vehicle systems and components. The ECU 26 is communicatively connected to the traction motor(s) 16 and battery pack 14 to control, for example, bi-directional transfer of energy between the pack 14 and each motor 16. For instance, the battery pack 14 may provide a DC voltage while a polyphase, hairpin-wound permanent magnet (PM) design of the motor(s) 16 may operate using a three-phase AC current; in such an instance, ECU 26 operates with a traction power inverter module (TPIM) 50 to convert the DC voltage to a three-phase AC current for use by the motor(s) 16. In a regenerative charging mode where the motor(s) 16 act as motor generator units (MGU), the ECU 26 may convert three-phase AC voltage produced by the motor(s) 16 to DC voltage compatible with the traction battery pack 14. The ECU 26 of FIG. 1 is also shown communicating with the charging component 22, for example, to condition the power supplied from the EVCS 20 to the battery pack 14 to help ensure compatible voltage and current levels. The ECU 26 may also interface with the charging station 20 to coordinate the rate and delivery of power to the vehicle 10.

Vehicle charging station 20 of FIG. 1 also offers wired charging via a "plug-in" electrical connector 32, which may be any one of a number of different commercially available connector types. By way of non-limiting example, electrical connector 32 may be a Society of Automotive Engineers (SAE) J1772 (Type 1) or J1772-2009 (Type 2) plug, a Combined Charging Standard (CCS) Type 1 or Type 2 plug, or an International Electrotechnical Commission (IEC) 62196-2 or 62196-3 plug. Moreover, the connector 32 (also referred to herein as "charger coupler") may offer single-phase and/or split-phase modes operating at 120 to 240 volts (V) with alternating current (AC) rates at 40 to 60 amperes (A) peak current for Level 2, low-power vehicle charging. The connector 32 is shown connecting via an HV electrical power cable 56 to a free-standing EVCS kiosk 58 and, via the kiosk 58, to a public power utility grid (not visible).

Accessible on the exterior of the vehicle body 12 is a charger port 34 configured as an electrical inlet into which the electrical connector 32 may be plugged or otherwise mated. For DCFC plug-in charging applications, the charger port 34 may be a female quick-connect, CCS1-compatible electrical socket that is rated, for example, at DC150A and 850V. The charger port 34 may function as a wired charging interface that enables a user to easily connect and disconnect the electric vehicle 10 to/from a readily available AC or DC source, such as a public utility power grid via charging station 20. Charge port 34 of FIG. 1 is not limited to any particular design, and may be any type of inlet, port, connection, socket, plug, etc., that enables conductive or other types of electrical connections. A hinged charge port door (CPD) 36 on vehicle body 12 can be selectively opened and closed to access and cover the charge port 34, respectively.

As part of the vehicle charging process, the vehicle 10 and EVCS 20 may individually or collaboratively monitor charging availability, power quality, and other related issues that may affect vehicle charging. According to the illustrated example, the vehicle ECU 26 may communicate with and receive sensor signals from a monitoring system, which may comprise one or more onboard "resident" sensing devices 28 of the vehicle 10 and/or one or more off-board "remote" sensing devices 30 of the vehicle charging station 20. In practice, this monitoring system may include a single sensor, or it may include a distributed sensor architecture with an assortment of sensors packaged at similar or alternative locations to that shown in the drawings. A CPD sensor 38 mounted by the charge port 34 may sense, and be polled or read by the vehicle's ECU 26 to determine, a door status— opened or closed—of the CPD 36. A latching button 40 used to physically attach and secure the electrical connector 32 to the charge port 34 may include an internal switch (e.g., an SAE S3 type switch) that functions as a sensing device to detect whether or not the electrical connector 32 is operatively connected to the charge port 34.

The representative vehicle 10 of FIG. 1 may be originally equipped with a vehicle telecommunication and information ("telematics") unit 42 that wirelessly communicates (e.g., via cell towers, base stations, mobile switching centers (MSCs), etc.) with a remotely located or "off-board" cloud computing system 44 (e.g., a back-office (BO) vehicle service provider). Acting as both a user-input device and a vehicle-output device, telematics unit 42 may be equipped with an electronic video display device and assorted input controls 46 (e.g., buttons, knobs, switches, trackpads, keyboards, touchscreens, etc.). The telematics unit may also operate as a human-machine interface (HMI), e.g., to enable a user to communicate with the telematics unit 42 and other systems and system components of the vehicle 10. Optional peripheral hardware may include a microphone that provides a vehicle occupant with means to input verbal or other auditory commands; the vehicle 10 may be equipped with an embedded voice-processing unit programmed with a computational speech recognition software module.

With continuing reference to FIG. 1, telematics unit 42 is an onboard computing device that provides a mixture of services, both individually and through its communication with other networked devices. Telematics unit 42 may be generally composed of one or more processors, each of which may be embodied as a discrete microprocessor, an application specific integrated circuit (ASIC), a dedicated control module, etc. Vehicle 10 may offer centralized vehicle control via ECU 26 that is operatively coupled to one or more electronic memory devices 48, each of which may take on the form of a solid-state drive (SSD), a hard disk drive (HDD), IC device, semiconductor memory (e.g., various types of RAM or ROM), etc., with a real-time clock (RTC). Long-range communication (LRC) capabilities with remote, off-board devices may be provided via one or more or all of a cellular chipset/component, a navigation and location component (e.g., global positioning system (GPS) transceiver), or a wireless modem, all of which are collectively represented at 52. Short-range communication (SRC) connectivity may be provided via a short-range wireless communications device (e.g., BLUETOOTH® unit or near field communications (NFC) transceiver), a dedicated short-range communications (DSRC) component, and/or a dual antenna, all of which are collectively represented at 54. The various comm devices described above may be configured to exchange data as part of a broadcast in a Vehicle-to-Vehicle (V2V) or a vehicle-to-everything (V2X) communications system, e.g., Vehicle-to-Infrastructure (V2I), Vehicle-to-Pedestrian (V2P), Vehicle-to-Device (V2D), etc.

During a vehicle charging event, an owner, operator, or passenger of the vehicle (collectively "user") may park the vehicle 10 adjacent the EVCS kiosk 58, manually retrieve the charger coupler 32, and insert the charger coupler 32 into the charger port 34. When inserted, the user may depress then release the latching button 40 on the handle of the charger coupler 32 in order to raise then lower a latching element protruding forward from the plug head of the charger coupler 32. Doing so operatively couples this latching element with a complementary catch inside the charger port 34 in order to prevent accidental uncoupling of the coupler 32 from the port 34. By measuring a voltage across the coupler's proximity pin, the vehicle ECU 26 may determine the status of the S3 switch and, from this status, the presence of the charger coupler 32.

To provision smart vehicle charge authorization, for example, on a Level-2 AC EVCS without digital PLC comm capabilities, herein described systems and methods use wireless communication protocols with encrypted vendor extension fields that are embedded within WiFi/SRC broadcast messages for dynamic vehicle identification. Utilizing a unique vehicle ID provided in the encrypted vendor extension, a bidirectional positioning routine maps real-time locations and relative positioning between the host vehicle and EVCS. A two-step bidirectional location and time check technique identifies and triangulates the real-time location of the host vehicle. Through a bidirectional exchange of ID data during vehicle approach and coupling, the system uses timestamps and wireless comms to identify the host vehicle's proximity to the EVCS and to identify the specific EVCS at which the host vehicle intends to couple and charge. As used herein, the terms "EVCS" and "EVSE" may be used interchangeably and synonymously to reference an individual vehicle charging station or device, a group of charging stations or devices, a commercial or other publicly accessible vehicle charging facility containing one or more vehicle charging stations or devices, etc.

In a more specific, yet non-limiting example, a host vehicle is assigned a Unique ID (e.g., a Media Access Control (MAC) address); upon arrival at an EVCS, the host dynamically encrypts and inserts the Unique ID into a broadcast WiFi frame as a vendor extension. Each EVCS at a municipal or commercial charging facility scans for these wirelessly transmitted beacons containing vendor extensions. Upon arrival at the charging facility, an EVCS will detect the presence of a host vehicle through receipt of the beacon-borne vendor extension ID. The EVCS transmits the encrypted unique ID to a central server of the charging facility; the server then determines the proximity of the host vehicle. When the vehicle operator operatively couples (e.g., plugs-in) to the charging station, the EVCS communicates with a BO computing host service to send: timestamps on the EVCS and on the vehicle at charge coupling; and a distance from the host vehicle to the EVCS as reported by both the vehicle and charging station. Using this information, a BO server automates identification of which motor vehicle is plugged into which charging station. Automatically enabled charging ("autocharging") is initiated upon confirming that the correct vehicle ID corresponds to the EVCS ID.

Smart charging features, such as vehicle autocharging, Vehicle-Grid Integration (VGI), residential/commercial demand-response, etc., are enabled at charging stations that do not support PLC Digital Comm, such as Level-2, low-power AC EVCS using analog pulse-width modulation (PWM) power delivery. These smart charging features and related charge authorization are enabled without the use of a hardline connection (e.g., a plug-in DC charge coupler with powerline communication) to determine which motor vehicle is connected to which charging station. Using encrypted wireless connectivity, such as WiFi network protocols and Short Range Communications (SRC) technologies, disclosed systems and methods may offer contactless charge activation/payment on legacy chargers using analog PWM comms. Doing so helps to prolong the operational life expectancy of existing EVCS with a concomitant reduction in the number of new charging stations being deployed to support day-to-day use of electrified vehicles. Other attendant benefits may include enhancing the number and types of charging features available for vehicles on partner EVSE. Eliminating the need for digital PLC comm capabilities for exchanging vehicle identification and charge parameters reduces the cost, complexity, and integration of new charging stations.

Figure 2:
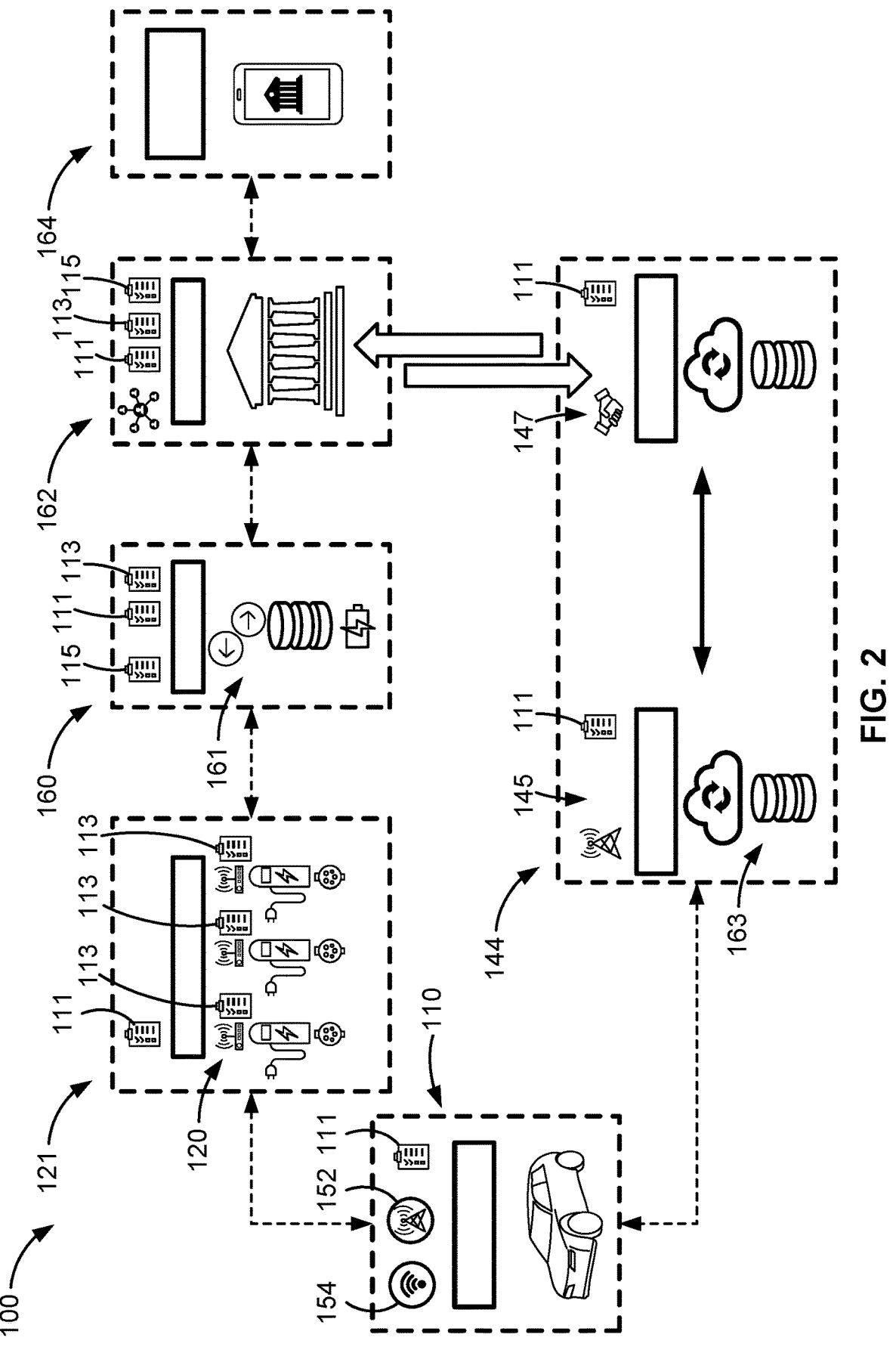
FIG. 2 is a diagrammatic illustration of a representative vehicle charging network for automating vehicle authorization and smart charging using encrypted wireless connectivity in accord with aspects of the present disclosure.

FIG. 2 is a diagrammatic illustration of an example of a vehicle charging network and wireless communications system, designated generally as 100, for automating vehicle authorization and smart charging using encrypted wireless connectivity. While depicting a single host vehicle 110 communicating over the vehicle charging network 100 with three plug-in type Level 2 (L2) AC EVCS 120 and a cloud-based BO vehicle service provider 144, it is envisioned that any logically relevant number and type of vehicle may operatively interface with any logically relevant number and type of vehicle services entity and EVSE that are suitably equipped for wirelessly exchanging information and charging the vehicle(s). Additionally, although differing in appearance, it is envisioned that any of the features and options described above with respect to the motor vehicle 10, charging station 20, and BO computing system 44 of FIG. 1 may be incorporated—singly and in any combination—into the host vehicle 110, EVCS 120, and vehicle service provider 144 of FIG. 2, and vice versa. The illustrated EVSE may take on numerous forms, including a full-service or self-service charging station having a parking area with multiple parking spots, each of which may align with a respective charging station.

Upon arrival of the host vehicle 110 at a vehicle charging facility 121 offering compatible EVSE, such as the L2 AC EVCS 120, the host vehicle 110 may establish a wireless connection with an EVCS 120 via an on-vehicle SRC device 154. At the same time, the host vehicle 110 may wirelessly connect with the BO vehicle service provider 144 either indirectly through a "piggyback" connection with the EVCS 120 and/or directly via an on-vehicle LRC device 152. Once connected, the host vehicle 110 may exchange charge-related data with the EVCS 120 and BO 144 in order to quickly and efficiently authenticate the vehicle 110 and enable one or more available smart charging operations. In accord with the illustrated example, the host vehicle 110 may dynamically generate and transmit a Vehicle Wireless Detection List ("V-List") 111 that may contain such information as a vehicle-specific unique ID (e.g., MAC Address) and timestamp of event data (e.g., RTC reading at time of plug in), both of which may be integrated as part of a data packet payload or as a packet extension frame. Additional information contained in the V-List 111 may include, for example, proximity information of individual EVSE to the host vehicle (e.g., detected by the host's in-vehicle hotspot device), calculated distance information (e.g., based on wireless signal strength), unique encoding/encryption data for broadcasting encrypted wireless messages (e.g., WiFi packet, DSRC broadcast beacon, etc.), and a plug-in event timestamp (e.g., using a control-pilot state change in the host vehicle). The data exchange may be adapted and scaled based, for example, on a desired level of accuracy, a user-selected level of security, an EVSE owner-selected level of authenticity, etc.

Once paired and actively exchanging data, the EVCS 120 may temporarily store the V-List 111, e.g., in resident buffer/cache memory or at a central EVSE facility server. In tandem, the EVCS 120 or vehicle charging facility 121 server may dynamically generate an EVSE Wireless Detection List ("E-List") 113 that may contain proximity information of the EVSE or a respective EVCS to the subject vehicle (e.g., detected by a resident EVCS hotspot); signal-strength based distance information; unique encoding/encryption information (e.g., for decrypting received WiFi Beacons); charge port usage status of the subject EVCS (e.g., plug-in detection+timestamp). The EVCS 120 wired or wirelessly transmits the V-List 111 and E-List 113 to a Charge Point Operator (CPO) node 160 that may be generally responsible for operating the EVSE vehicle charging facility 121; the CPO node 160 may store this data in a resident server database 161. Using this information, the CPO node 160 may dynamically generate an EVSE Configuration List ("C-List") 115 that may contain such information as EVSE configuration and installation data, parking data, and charging performance data. In a more specific, yet non-limiting example, the C-List 115 may also detail a total number of EVCS at the EVSE, compatible charge port requirements, parking lot and space layout, and communication reference data, such as WiFi performance metrics.

With continuing reference to FIG. 2, the CPO node 160 may operate the charging network hardware and infrastructure, manage backend technologies and support software, and govern connection between the chargers to deliver reliable and consistent EV charging. The CPO node 160 may transmit the V-List 111, E-List 113, and C-List 115 to an e-Mobility Service Provider and Mobility Operator (eMSP/MO) node 162 that may generally facilitate vehicle charging and payment services as well as enable access to assorted charge points within the eMSP/MO's network. In this capacity, the eMSP/MO node 162 may operate as a middleware application for wirelessly exchanging data with a wireless-enabled portable computing device 164 of a vehicle owner, driver, or occupant (collectively "user") of the host vehicle 110. The eMSP/MO node 162 may also communicate with BO vehicle service provider 144, including a Software Defined Vehicle Back Office (SDV BO) node 145 and a Digital Business Technology and Transformation (DBTT) node 147. In accord with the illustrated example, the SDV BO node 145 may provide cloud-based vehicle analytics and data collection services, whereas the DBTT node 147 may provide cloud-based business-to-business (B2B) services for enabling interoperability between multiple discrete business entities, such as BO 144 and eMSP 162.

Figure 3:
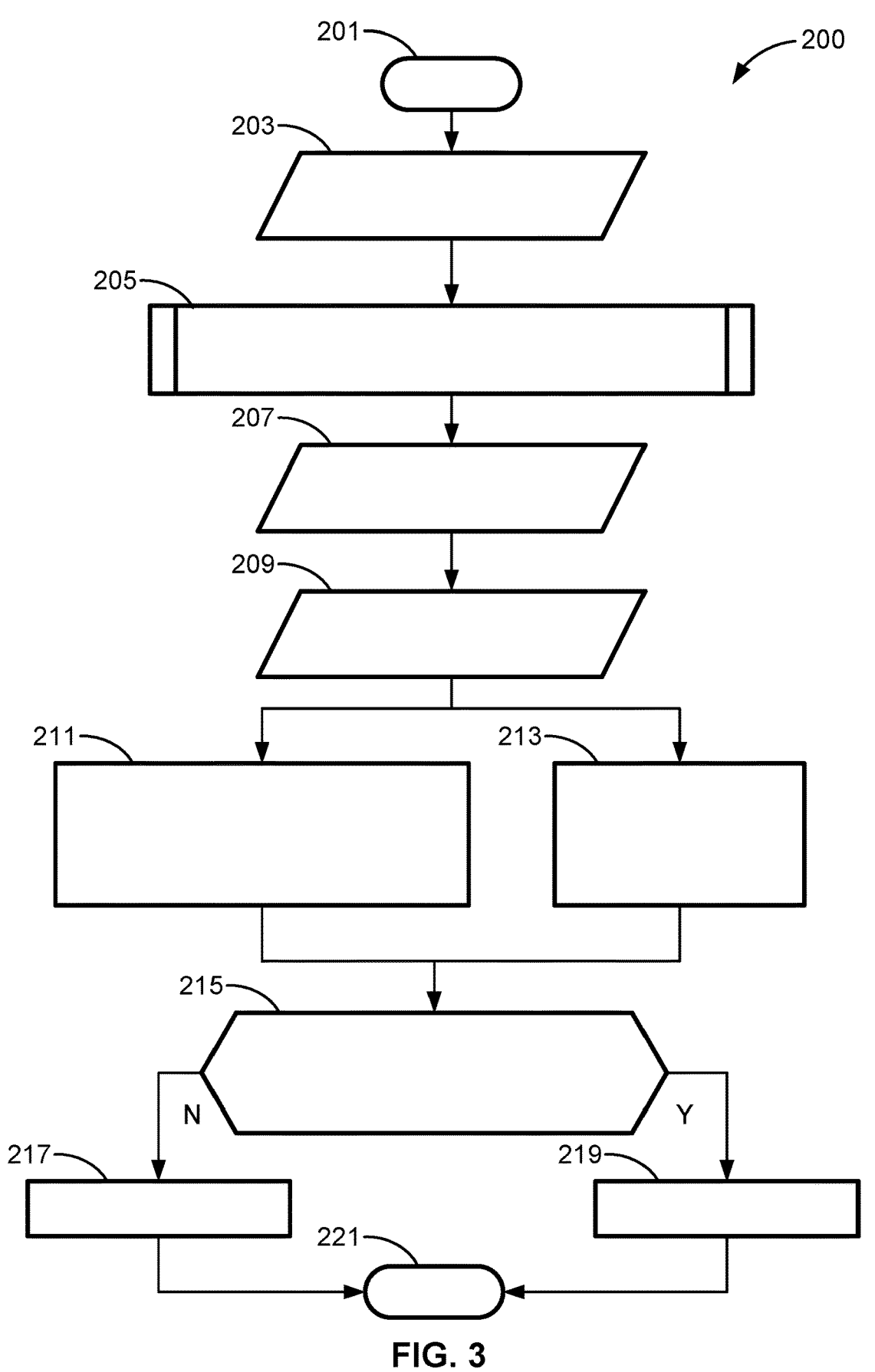
FIG. 3 is a flowchart illustrating a representative intelligent vehicle charging algorithm for governing a smart charging operation for a motor vehicle, which may correspond to memory-stored instructions that are executable by a resident or remote controller, control-logic circuit, programmable control unit, or other integrated circuit (IC) device or network of devices in accord with aspects of the disclosed concepts.

With reference next to the flow chart of FIG. 3, an improved method or control strategy for automated authorization of a host vehicle, such as automobiles 10 and 110 of FIGS. 1 and 2, and activation of a smart vehicle charging operation, such as via EVCS 20 and 120, is generally described at 200 in accordance with aspects of the present disclosure. Some or all of the operations illustrated in FIG. 3 and described in further detail below may be representative of an algorithm that corresponds to non-transitory, processor-executable instructions that are stored, for example, in main or auxiliary or remote memory (e.g., memory device(s) 48 of FIG. 1 and/or server database 161 of FIG. 2), and executed, for example, by an electronic controller, processing unit, dedicated control module, logic circuit, or other module or device or network of modules/ devices (e.g., ECU 26 of FIG. 1 and/or BO server of FIG. 2), to perform any or all of the above and below described functions associated with the disclosed concepts. It should be recognized that the order of execution of the illustrated operation blocks may be changed, additional operation blocks may be added, and some of the herein described operations may be modified, combined, or eliminated.

Method 200 begins at START terminal block 201 of FIG. 3 with memory-stored, processor-executable instructions for a programmable controller or control module or similarly suitable processor to call up an initialization procedure for a vehicle charging control protocol. This routine may be executed in real-time, near real-time, continuously, system-atically, sporadically, and/or at regular intervals, for example, each 10 or 100 milliseconds during regular and routine operation of the motor vehicle 10. As yet another option, terminal block 201 may initialize responsive to a user command prompt (e.g., via telematics input controls), a resident vehicle controller prompt (e.g., from ECU 26), or a broadcast prompt signal received from a centralized backend vehicle services system (e.g., from EVCS 120 or BO 144). By way of non-limiting example, the method 200 may automatically trigger in response to detection by the host vehicle 110 of EVCS 120 or upon receipt of a pairing handshake prompt received by host vehicle 110 from EVCS 120. Upon completion of some or all of the control opera-tions presented in FIG. 3, the method 200 may advance to END terminal block 221 and temporarily terminate or, optionally, may loop back to terminal block 201 and run in a continuous loop.

Advancing from terminal block 201 to UNIQUE ID data input block 203, the method 200 provides memory-stored, processor-executable instructions for a vehicle controller to access a resident or remote memory device to retrieve therefrom a unique ID that is assigned to that host vehicle. In accord with the example of FIG. 2, the host vehicle 110 is assigned a distinct, vehicle-specific alphanumeric code, such as a MAC address of vehicle identification number (VIN) number; this unique ID may be stored in readily accessible resident cache memory 48. The BO vehicle service provider 144 maintains a BO server database 163 with a repository of vehicle IDs each associated with one or more select smart vehicle charging operations for which they are authorized to perform. As an alternative option to using a MAC address, a subject vehicle's unique ID and associated attributes may be ascribed by the BO or randomly assigned, e.g., based on an algorithm.

After retrieving the host vehicle's unique ID at data input block 203, method 200 executes ID ENCRYPTION pre-defined process block 205 and converts the ID (plaintext) into a cipher or code (ciphertext) that may help to ensure confidentiality and prevent unsanctioned access to the unique ID while in transit to the BO 144. By way of non-limiting example, when the host vehicle 100 of FIG. 2 arrives at the vehicle charging facility 121, a vehicle con-troller (e.g., ECU 26) responsively encrypts and inserts the vehicle's unique ID in a wireless message, such as a WiFi data packet, a V2X DSRC beacon, etc. Vehicle data encryp-tion and insertion (collectively "embedding") may be con-figured as part of a default vehicle broadcast process (e.g., not in response to the vehicle approaching the EVSE). Put another way, the broadcast message may, by default, be "prefilled" with the encrypted information at all times; the host vehicle need not/does not wait to be in proximity to the EVSE/EVCS to embed the unique ID and related informa-tion.

This embedding process may encrypt the unique ID using a mutually agreed upon encryption process, such as a Transport Layer Security (TLS) cryptographic protocol, a Triple Data Encryption (DES) symmetric-key block cipher, or a public-key encryption scheme, and then insert the now encrypted unique ID into a dedicated extension frame (also referred to herein as "Vendor Extension Field") within the wireless message. For at least some implementations, a vehicle hotspot device within the host vehicle (e.g., a 5G LTE mobile hotspot router) encrypts the unique ID. The mutually agreed upon encryption process may be established between the BO vehicle service provider 144 and the Charge Point Operator 160. While a host vehicle may encrypt its unique ID and the EVCS/EVSE may identify and, option-ally, parse the encrypted unique information for forwarding to the BO, it may be desirable that all decryption of encrypted IDs be performed by the BO vehicle service provider (i.e., EVCS 120 and EVSE 121 are pass-through devices that merely forward vehicle info to the backend BO vehicle services provider 144 without deciphering or parsing of the data).

After embedding the unique ID at predefined process block 205, method 200 proceeds to ENCRYPTED ID data output block 207 at which the host vehicle transmits the encrypted unique ID to the vehicle charging station and the vehicle services provider. For instance, the vehicle controller (e.g., ECU 26) may broadcast the wireless message embed-ded with the encrypted unique ID (e.g., V-List 111) from a wireless communications device (e.g., SRC device 54) to a charging station (e.g., one of the L2 AC EVCS 120). The charging station, in turn, transmits the encrypted unique ID, e.g., contained within or parsed from the wireless message, to the BO vehicle service provider 144. In accord with the illustrated example of FIG. 2, the host vehicle 110 may transmit the V-List 111 directly to the BO vehicle service provider 144 via cell/sat comm channels using LRC device 152. For at least some desired implementations, the vehicle charging facility 121 and EVCS 120 act as a middleware computing node through which the V-List 111 is transmitted to the BO 144, for example, as part of a vehicle-to-infra-structure (V2I) data exchange. As will be described in further detail below, a host vehicle may also generate and embed other functional information into the wirelessly broadcast message (e.g., GPS-generated geopositional data, vehicle plug-in timestamp, vehicle-to-charger distance and signal-strength data, etc.). It may be desirable that the EVSE/EVCS is not enabled to extract and/or interpret any of the encrypted content information output from the host vehicle; identification monitors and other non-encrypted plaintext information will be allowed for the EVSE and vehicle to identify and operatively connect to each other.

Prior to, contemporaneous with, or after transmitting the encrypted vehicle ID and attendant data to the BO, the charging station and host vehicle may assess whether or not they are within a predefined proximity of each other. In a similar regard, the BO may automatically respond to receipt of the encrypted vehicle data by evaluating whether or not the subject vehicle is within a predefined proximity to the EVSE/EVCS. As shown, the EVSE 121 central server may establish that the host vehicle 110 is within approximately thirty (30) feet or less of the EVCS 120 based on a unique shared "secret" message that is encrypted and inserted into the wirelessly broadcast message. As the host vehicle 110 approaches the EVSE vehicle charging facility 121, for example, it will repeatedly broadcast a wireless beacon with the embedded vehicle data; one or more or all of the EVCS 120 at the station 121 may receive and scan the beacon. An EVCS 120 captures the frames within the beacon to identify supplementary vehicle information, if any, that has been inserted into a dedicated frame extension. Once the EVCS 120 verifies that this extension is populated (e.g., with a unique shared message), it may conclude that a recognized vehicle is in proximity; the EVCS 120 then forwards the extension-borne information to the BO for decryption and authorization.

Once the message-embedded information is decrypted by backend services, the BO may use the decrypted information to confirm the identity of the host vehicle and conclude that this host vehicle is within proximity for operatively coupling to the charging station. This information also allows the BO to confirm that the subject vehicle is in fact within proximity of the station because only that vehicle would have sent a beacon that includes this unique ID information to the station. The BO may then enter a delay loop to wait for a charge coupling event to occur (e.g., the operator of vehicle 10 plugs the electrical connector 32 into the charger port 34). CHARGE COUPING data input block 209, for example, confirms that the host vehicle 10, 110 operatively couples to the EVCS 20, 120 via plug-in connection, WPT connection, or other suitable charging technique.

After receiving sufficient data indicative of a mated charge coupling between the subject vehicle and charging station, the backend BO may responsively authenticate or rebuff the vehicle for smart charging using both a bidirectional location mapping evaluation (Block 211) and a time-stamped geopositional evaluation (Block 213). At BIDIRECTIONAL LOCATION MAPPING process block 211, the vehicle-coupled EVCS 120 derives a charger-to-vehicle (first) distance between the EVCS's wireless communications device and the host vehicle's wireless communications device using a wireless localization technique. In an example, the mated charging station may calculate a message transmission time between a broadcast time when the beacon was initially broadcast by the host vehicle and a receipt time when the beacon was received by the charging station. Using the calculated message transmission time and available message transmission speed information, the charging station may determine a real-time distance between the vehicle and station at the time the beacon was sent. An EVCS or EVSE controller (e.g., central EVCS controller 62 of FIG. 1) transmits this charger-to-vehicle distance to the BO vehicle services provider.

Concurrent with the EVCS deriving and relaying a real-time distance between the charging station and the host vehicle, the host vehicle controller derives a vehicle-to-charger (second) distance between the host vehicle and the EVCS using, for example, one or more of the host vehicle's on-vehicle sensing devices at process block 211. By way of example, and not limitation, the host vehicle 110 may employ forward and rearward-facing high-definition (HD) camera arrays, ultrasonic proximity sensors, and/or LiDAR and RADAR targeting and distance sensors to target and position the charging station. The host vehicle's controller transmits this vehicle-to-charger distance to the BO vehicle services provider, either directly or through the EVCS.

In parallel with process block 211, TIMESTAMP & GEOPOSITIONAL process block 213 produces additional information that is evaluated by the BO before enabling a smart charging session, e.g., to increase the reliability of the authorization process. In accord with the illustrated example, the host vehicle's ECU 26 communicates with the on-vehicle RTC and GPS transceiver to determine: (1) a vehicle coupling (first) timestamp identifying when the host vehicle operatively coupled to the EVCS for charging the vehicle's battery pack; and (2) a vehicle (first) geopositional data set indicative of a real-time location of the host vehicle at the time of charge coupling. The host vehicle transmits the vehicle coupling timestamp and geopositional data, either directly or through the EVCS, to the BO vehicle services provider. In the same vein, the EVCS/EVSE controller (e.g., EVCS controller 62 of FIG. 1) determines: (1) a charger coupling (second) timestamp identifying when the host vehicle operatively coupled to the EVCS; and (2) an EVCS (second) geopositional data set indicative of a real-time location of the EVCS at the time of charge coupling. The EVCS transmits the charger coupling timestamp and geopositional data to the BO vehicle services provider, e.g., via the CPO and eMSP/MO nodes 160 and 162.

After accumulating the vehicle-generated and charger-generated spatial and temporal information output at process blocks 211 and 213, method 200 advances to VEHICLE AUTHENTICATION decision block 215 to determine whether or not to authorize a smart charging session for a subject vehicle by comparing geo-location, timestamp, and proximity data against corresponding preset threshold values. BO vehicle service provider 144 of FIG. 2, for example, may conduct a tripartite authentication analysis to: (1) compare the relative proximities of the host vehicle and charging station to each other at the time of charge coupling; (2) compare the real-time geopositional locations of the host vehicle and charging station at the time of charge coupling; and (3) compare the timestamps of the host vehicle and charging station at the time of charge coupling. A first step of the analysis may include the BO 144 calculating a distance differential as an absolute value of a mathematical difference between the vehicle-to-charger distance and the charger-to-vehicle distance; the BO then determines if the distance differential is less than a preset distance differential threshold.[1] A second step of the analysis may include the BO 144 calculating a time differential as an absolute value of a mathematical difference between the vehicle coupling timestamp and the charger coupling timestamp; the BO then determines if the time differential is less than a preset time differential threshold.[2] A third step of the analysis may include the BO 144 determining if the vehicle's geopositional data/real-time location is substantially equal to the EVCS's geopositional data/real-time location (e.g., within about 1-3 meters).[3]

$$\text{ABS(Distance (Station to Vehicle)} - Di32stance(\text{Vehicle to Station})) <$$
$$\text{Distance}$$
$$\text{Threshold}^1$$
$$\&\&$$
$$\text{ABS(Time on Vehicle} - \text{Time on Station)} < \text{Time Threshold}$$
$$\&\&$$
$$GPS(\text{Vehicle}) \sim\, = GPS(\text{Station})^3$$

While not per se required, a true-positive result may necessitate all three steps in the aforementioned tripartite authentication analysis be true.

If automated vehicle authentication is denied (Block 215=NO), method 200 may responsively execute AUTHENTICATION DENIED process block 217 and transmit an electronic notification to a vehicle user indicating that the host vehicle has not been automatically validated by the BO. For at least some implementations, the BO 144 may transit an electronic notification to the CPO 160 that automated authentication of host vehicle 110 has failed; EVSE 121 central server and/or EVCS 120 central controller may respond by temporarily denying some or all available smart charging operations to the host vehicle 110. At this juncture, the vehicle user may manually submit an electronic request to commence vehicle charging, e.g., via wireless-enabled portable computing device 164.

Conversely, if automated vehicle authentication is approved (Block 215=YES), method 200 may responsively execute AUTHENTICATION APPROVED process block 219 and commence one or more smart charging operations for the rechargeable battery pack of the host vehicle by the EVCS. In this instance, the BO 144 may transit an electronic notification to the CPO 160 that automated authentication of host vehicle 110 is successful; EVSE 121 central server and/or EVCS 120 central controller may respond by activating one or more pre-approved smart charging operations associated with the host vehicle 110. An electronic notification may also be transmitted from the BO 144 to the user's wireless-enabled portable computing device 164 indicating that the host vehicle has been automatically validated by the BO for smart charging.

It is also within the scope of this disclosure to apply herein-described "access control" concepts in public, semi-public, and private environments (e.g., no payment scope/public chargers/employee chargers/hotels/paid-for parking) for authorized vehicles to charge on EVSEs. For instance, a backend BO service may be unavailable or unresponsive or, if desired, intentionally omitted from the network; in this instance, communications and authentication may be managed between the host vehicles and EVSE/CPOs (e.g., using wireless beacons embedded with shared "secret" data). As another option, pairing of vehicles and EVSE may be by way of a broadcast wireless beacon from the EVCS/EVSE to the vehicle. Disclosed features may also enable access control for use of Level 2/Level 1 chargers in homes (inside or outside of garage/condo), hotels, parking, employee-use-only chargers, etc., for authorized vehicles. Disclosed features may also enable the ability to define parameters/security codes for use in beacons using vehicle/mobile apps. Another option may include the EVSE broadcasting a wireless message that is received and processed by nearby vehicles. These EVSE/EVCS-broadcast wireless messages may contain such information as cable diagnostic data, available power, charging current limits, charger health data, charge cord/plug faults, charging capabilities, and other related information. Other embedded data may include identifying and notifying customers of relevant information to guide him to use available/appropriate/working charger (e.g., if multiple chargers exist).

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of controlling a charging operation of a host vehicle having a vehicle controller, a wireless communications device, and a rechargeable battery pack connectable to an electric vehicle charging station (EVCS) with an EVCS controller, the method comprising:

retrieving, via the vehicle controller from a memory device, a unique ID assigned to the host vehicle;

embedding, via the vehicle controller responsive to approaching the EVCS, the unique ID in a wireless message, the embedding including encrypting the unique ID and inserting the encrypted unique ID into a dedicated extension frame within the wireless message;

broadcasting, via the vehicle controller from the wireless communications device to the EVCS, the wireless message with the encrypted unique ID embedded in the wireless message;

transmitting, from the EVCS controller to a back-office (BO) vehicle services provider, the encrypted unique ID parsed from the wireless message; and commencing, via the EVCS controller responsive to the BO vehicle services provider decrypting and authenticating the unique ID, the charging operation of the rechargeable battery pack of the host vehicle by the EVCS.

2. The method of claim 1, further comprising:

determining, via the EVCS controller, a charger-to-vehicle distance between the EVCS and the wireless communications device using a wireless localization technique; and transmitting, via the EVCS controller to the BO vehicle services provider, the charger-to-vehicle distance.

3. The method of claim 2, further comprising:

determining, via the vehicle controller, a vehicle-to-charger distance between the host vehicle and the EVCS using an on-vehicle sensing device of the host vehicle; and transmitting, via the vehicle controller through the EVCS to the BO vehicle services provider, the vehicle-to-charger distance.

4. The method of claim 3, further comprising:

calculating a distance differential as an absolute value of a mathematical difference between the vehicle-to-charger distance and the charger-to-vehicle distance; and determining if the distance differential is less than a preset distance differential threshold, wherein the BO vehicle services provider authenticates the unique ID based, in part, on the distance differential being less than the preset distance differential threshold.

5. The method of claim 1, further comprising:

transmitting, via the vehicle controller through the EVCS to the BO vehicle services provider, a vehicle coupling timestamp at which the host vehicle operatively couples to the EVCS for charging the rechargeable battery pack; and transmitting, via the EVCS controller to the BO vehicle services provider, a charger coupling timestamp at which the host vehicle operatively couples to the EVCS.

6. The method of claim 5, further comprising:

calculating a time differential as an absolute value of a mathematical difference between the vehicle coupling timestamp and the charger coupling timestamp; and determining if the time differential is less than a preset time differential threshold, wherein the BO vehicle services provider authenticates the unique ID based, in part, on the time differential being less than the preset time differential threshold.

7. The method of claim 1, further comprising:

transmitting, via the vehicle controller through the EVCS to the BO vehicle services provider, a vehicle geopositional data set indicative of a real-time location of the host vehicle;

transmitting, via the EVCS controller to the BO vehicle services provider, an EVCS geopositional data set indicative of a real-time location of the EVCS; and determining if the vehicle geopositional data set is substantially equal to the EVCS geopositional data set, wherein the BO vehicle services provider authenticates the unique ID based, in part, on the vehicle geopositional data set being approximately equal to the EVCS geopositional data set.

8. The method of claim 1, further comprising:

embedding, via the vehicle controller responsive to approaching the EVCS, a unique shared message in the wireless message, and determining, via the EVCS controller responsive to receiving the unique shared message embedded in the wireless message, the host vehicle is within a predetermined proximity to the EVCS.

9. The method of claim 1, further comprising:

determining, via the vehicle controller, the host vehicle is operatively coupled to the EVCS for charging the rechargeable battery pack; and appending, via the vehicle controller to the wireless message responsive to the host vehicle being operatively coupled to the EVCS, a vehicle geopositional data set indicative of a real-time location of the host vehicle and a vehicle coupling timestamp at which the host vehicle was operatively coupled to the EVCS, wherein the BO vehicle services provider authenticates the unique ID based, in part, on the vehicle geopositional data set and the vehicle coupling timestamp.

10. The method of claim 9, wherein operatively coupling the host vehicle to the EVCS includes:

inserting an electrical connector plug of the EVCS into a plug port of the host vehicle; and/or mating a wireless power transfer (WPT) receiving component of the host vehicle with a WPT transmitter component of the EVCS.

11. The method of claim 1, wherein the wireless communications device includes a WiFi hotspot device and/or a short-range communications (SRC) device, and wherein the wireless message includes a network data packet and/or a quick-charge communications handshake.

12. The method of claim 1, wherein the EVCS is an alternating current (AC) charging station characterized by a lack of programmable logic controller (PLC) communications capabilities and operable to output power at about 60 amperes (A) or less and 240 volts (V) or less.

13. Non-transitory, computer-readable media storing instructions executable by a host vehicle with a vehicle controller and/or an electric vehicle charging station (EVCS) with an EVCS controller, the host vehicle including a wireless communications device and a rechargeable battery pack connectable to the EVCS, the instructions, when executed, causing the vehicle controller and/or the EVCS controller to perform operations comprising:

retrieving, via the vehicle controller from a memory device, a unique ID assigned to the host vehicle;

embedding, via the vehicle controller responsive to approaching the EVCS, the unique ID in a wireless message, the embedding including encrypting the unique ID and inserting the encrypted unique ID into a dedicated extension frame within the wireless message;

broadcasting, via the vehicle controller from the wireless communications device to the EVCS, the wireless message with the encrypted unique ID embedded in the wireless message;

transmitting, from the EVCS controller to a back-office (BO) vehicle services provider, the encrypted unique ID parsed from the wireless message; and commencing, via the EVCS controller responsive to the BO vehicle services provider decrypting and authenticating the unique ID, a charging operation for the rechargeable battery pack of the host vehicle by the EVCS.

14. A vehicle charging network, comprising:

a host vehicle including a vehicle controller, a wireless communications device, and a rechargeable battery pack, the vehicle controller being programmed to:

retrieve, from a memory device, a unique ID assigned to the host vehicle;

embed the unique ID in a wireless message, the embedding including encrypting the unique ID and inserting the encrypted unique ID into a dedicated extension frame within the wireless message; and broadcast, from the wireless communications device, the wireless message with the encrypted unique ID embedded in the wireless message; and an electric vehicle charging station (EVCS) connectable to the rechargeable battery pack and including an EVCS controller, the EVCS controller being programmed to:

receive the broadcast wireless message including parsing the encrypted unique ID from the wireless message;

transmit the encrypted unique ID parsed from the wireless message to a back-office (BO) vehicle services provider; and responsive to the BO vehicle services provider decrypting and authenticating the unique ID, commence a charging operation for the rechargeable battery pack of the host vehicle by the EVCS.

15. The vehicle charging network of claim 14, wherein the EVCS controller is further programmed to:

determine a charger-to-vehicle distance between the EVCS and the wireless communications device using a wireless localization technique; and transmit the charger-to-vehicle distance to the BO vehicle services provider.

16. The vehicle charging network of claim 15, wherein the vehicle controller is further programmed to:

determine a vehicle-to-charger distance between the host vehicle and the EVCS using an on-vehicle sensing device of the host vehicle; and transmit the vehicle-to-charger distance through the EVCS to the BO vehicle services provider.

17. The vehicle charging network of claim 16, wherein the BO vehicle services provider:

determines a distance differential as an absolute value of a mathematical difference between the vehicle-to-charger distance and the charger-to-vehicle distance;

determines if the distance differential is less than a preset distance differential threshold; and authenticates the unique ID based, in part, on the distance differential being less than the preset distance differential threshold.

18. The vehicle charging network of claim 14, wherein the vehicle controller is further programmed to transmit, through the EVCS to the BO vehicle services provider, a vehicle coupling timestamp at which the host vehicle operatively couples to the EVCS for charging the rechargeable battery pack, and wherein the EVCS controller is further programmed to transmit, the BO vehicle services provider, a charger coupling timestamp at which the host vehicle operatively couples to the EVCS.

19. The vehicle charging network of claim 18, wherein the BO vehicle services provider:

determines a time differential as an absolute value of a mathematical difference between the vehicle coupling timestamp and the charger coupling timestamp;

determines if the time differential is less than a preset time differential threshold; and authenticates the unique ID based, in part, on the time differential being less than the preset time differential threshold.

20. The vehicle charging network of claim 14, wherein the vehicle controller is further programmed to embed a unique shared message in the wireless message, and wherein the EVCS controller is further programmed to determine from the received unique shared message embedded in the wireless message the host vehicle is within a predetermined proximity to the EVCS.

* * * * *